March 4, 1958  R. J. POLIVKA  2,825,143
TEMPLATE CENTERING JIG

Filed Feb. 12, 1954  3 Sheets-Sheet 1

INVENTOR.
RUDOLPH JOHN POLIVKA
BY A.C. Schwarz, Jr.
ATTORNEY

March 4, 1958  R. J. POLIVKA  2,825,143
TEMPLATE CENTERING JIG
Filed Feb. 12, 1954  3 Sheets-Sheet 2
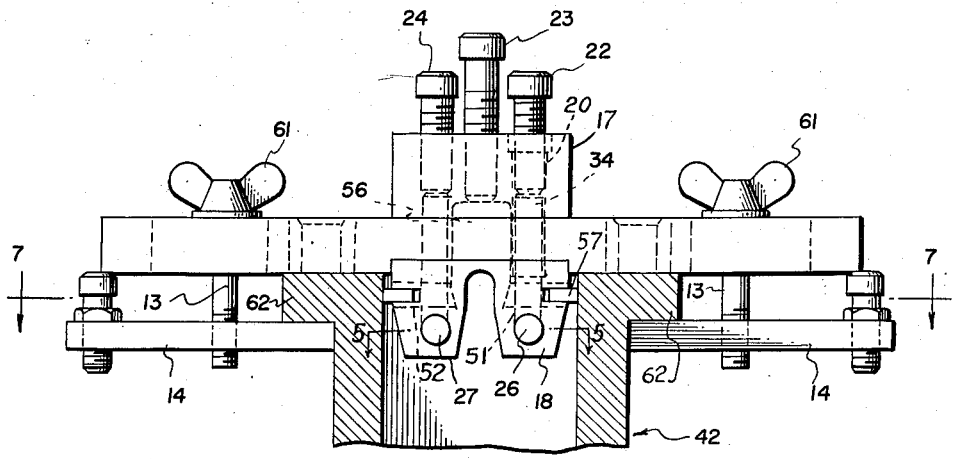
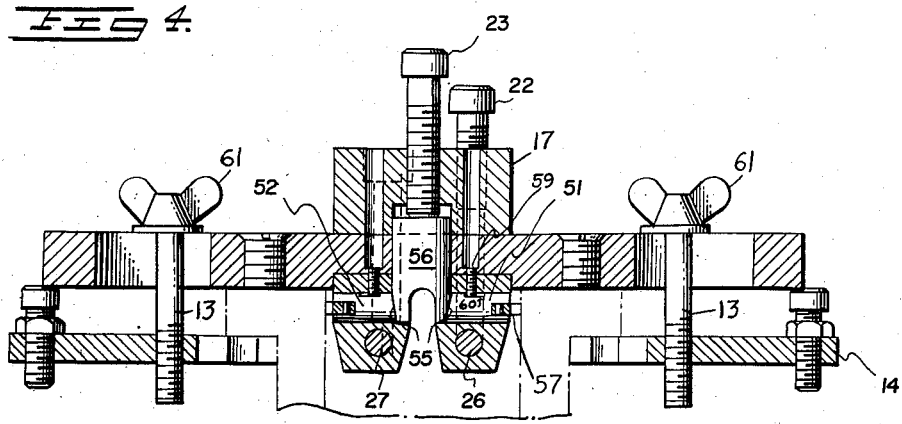
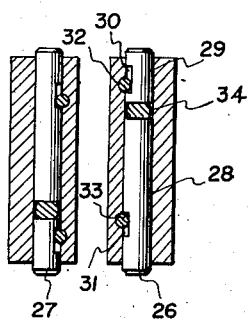
INVENTOR.
RUDOLPH JOHN POLIVKA
BY A. C. Schwarz, Jr.
ATTORNEY.

March 4, 1958

R. J. POLIVKA 2,825,143

TEMPLATE CENTERING JIG

Filed Feb. 12, 1954

INVENTOR.
RUDOLPH JOHN POLIVKA
BY A. C. Schwarz, Jr.
ATTORNEY

United States Patent Office 2,825,143
Patented Mar. 4, 1958

2,825,143

TEMPLATE CENTERING JIG

Rudolph John Polivka, Winston-Salem, N. C., assignor to Western Electric Company, Incorporated, New York, N. Y., a corporation of New York Application February 12, 1954, Serial No. 409,965

5 Claims. (Cl. 33—185)

This invention relates to template centering jigs and more particularly to a jig for centering a drill template with respect to two complementary portions.

It often occurs in the manufacture of elements which have apertures therein and which will later be drilled and a pair of such elements assembled, that because the apertures may be made to different sizes, such as a plus or minus tolerance, the holes are difficult to drill so that they will match when assembled. The most desirable method of assuring proper assembly is to locate the drilled holes with respect to the centerpoint of the aperture.

Accordingly, a primary object of the present invention is to provide a jig which assures the location of a template with respect to the centerpoint of an aperture.

The invention has among its further objects the provision of a jig for accurately locating a point or points to be worked on a surface in a predetermined relation to an aperture therein such that when similar surfaces, likewise worked, are secured together, the apertures therein will be accurately aligned.

The invention still further resides in certain novel features of parts, and further objects and advantages thereof will be apparent to those skilled in the art to which it pertains from the following description of the present preferred embodiment thereof, described with respect to the accompanying drawings in which similar reference characters represent corresponding parts in the several views and in which:

Fig. 3 is a front elevational view of the device shown in Fig. 1 with a portion of the flanged tubing clamped in place.

Fig. 4 is a view taken substantially along line 4—4 in Fig. 2 with a portion of the flanged tubing clamped in place;

Fig. 5 is a view taken substantially along line 5—5 in Fig. 3;

Generally, the present invention comprises a rectangular drill template with a depending rectangular body portion to fit inside the end of a two-piece flanged tubing, such as wave guide tubing, and a clamp on each of two opposite ends of the template for securing the template to the flange of the tubing after centering. For centering the template, there are extending horizontally from the body portion a plurality of pins to engage the inner walls of the tubing. The pins on two opposite sides of the body portion are each actuated by threaded rod members through the template. Parallel to each of the other two sides are two arms pivotal at their respective centers each on a shaft extending toward the center of the body portion, both shafts being actuated by a single threaded rod member through the template. At each end of the two arms is an abutment to engage the inner walls of the tubing. Holes may be drilled in the flanges of successive wave guides with the assurance that if two flanges are joined, the center lines of the two tubes will be in alignment.

In the present invention the flanged wave guide is formed of two complementary portions, each formed with an aperture therein, so that the shape of each portion may be likened to a channel in shape, the length of the apertures between the two parallel legs of the channel may vary, because of plus and minus tolerances, but the ends of the parallel legs are formed parallel to the single side forming the channel. These two portions are connected to form a section of the flanged wave guide tubing, and ultimately will be connected to another similar assembly to join two sections of wave guide tubing.

Figure 1:
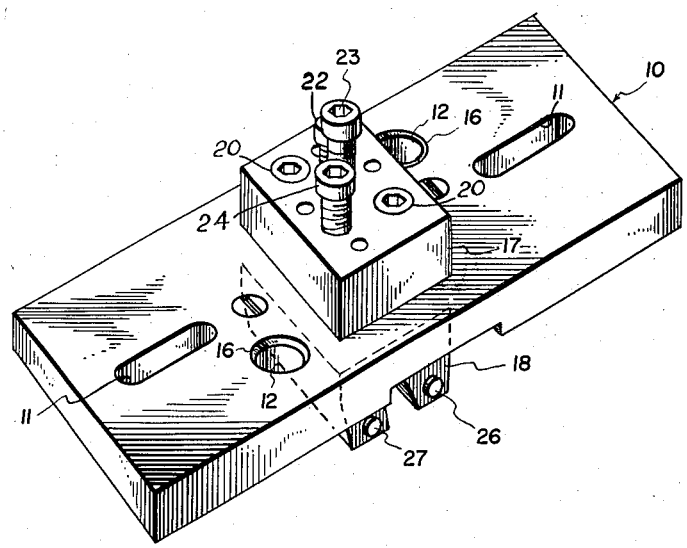
Fig. 1 is a perspective view of the centering device and template.

Referring now to Fig. 1 in the drawings, the rectangular member 10 is a drill template having located therein two slots 11—11 and a plurality of apertures 12—12. The slots 11—11 are to allow bolts 13—13, Fig. 3, to pass through the template and be threaded into clamping plates 14—14. The apertures 12—12, in which are drive-fitted hardened bushings 16—16, serve as drill guides during the operation of drilling the flange of the tubing. Centrally located on the template is a block 17 which is secured to the template 10 by means of two threaded rods 20—20.

Figure 2:
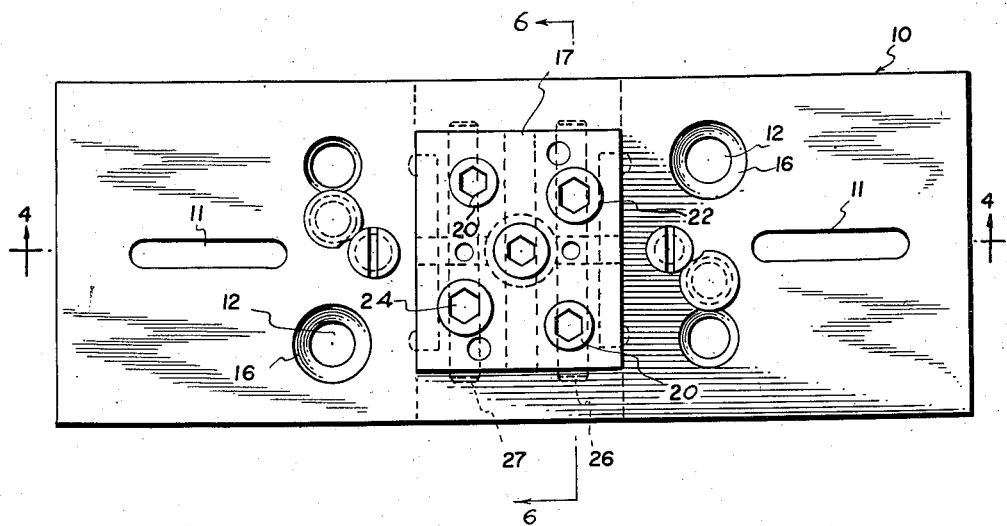
Fig. 2 is a plan view of Fig. 1.

Referring now more particularly to Figs. 2 and 3, rods 22, 23, and 24 are the control members for actuating the centering device which will now be described. Located in the lower portion 18 of block 17 are two centering pins 26 and 27 actuated through the means of rods 22 and 24, respectively.

The pin 26, Fig. 5, is divided into two sections or locating members 28 and 29 with slots 30 and 31 cooperating with dowel pins 32 and 33 to secure each section or locating member of the centering pin and to limit its travel. The pin 27 is arranged similarly to the pin 26.

Figure 6:
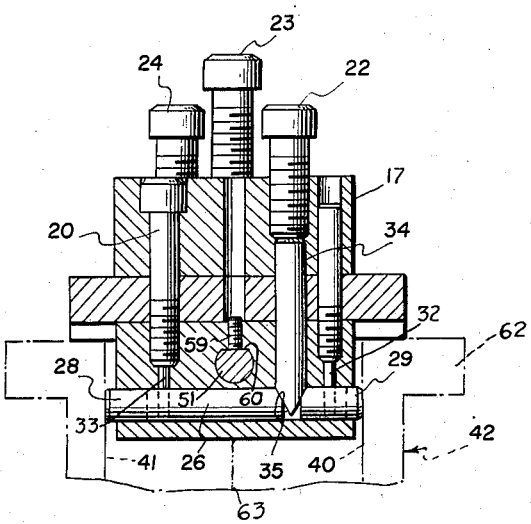
Fig. 6 is a view taken substantially along line 6—6 in Fig. 2 with a representative flanged member in place.
Figure 8:
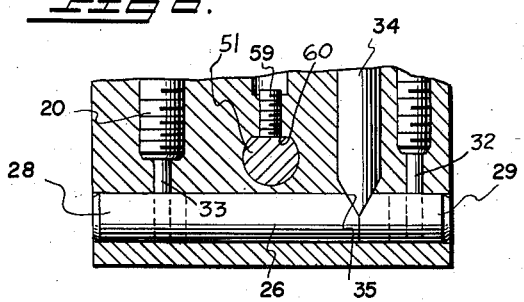
Fig. 8 is an enlarged view of the lower portion of Fig. 6 with the members in a retracted position.

Referring now to Figs. 6 and 8, it may be seen how the centering pin 26 is actuated. An actuating pin 34 with a cam surface 35 is shown in its retracted position in Fig. 8. Then by turning the rod 22 and threading it downwardly, the actuating pin 34 is urged also downwardly causing the sections or locating members 28 and 29 of the centering pin 26 to move apart and outwardly until they engage the inner walls 40 and 41 of the tubing 42, Fig. 6. The centering pin 27 is actuated in like manner to complete the centering of the jig with respect to the walls 41 and 40 of the tubing. In order to center the jig, and template, with respect to the remaining two walls of the tubing, the center rod 23 must be actuated.

Figure 7:
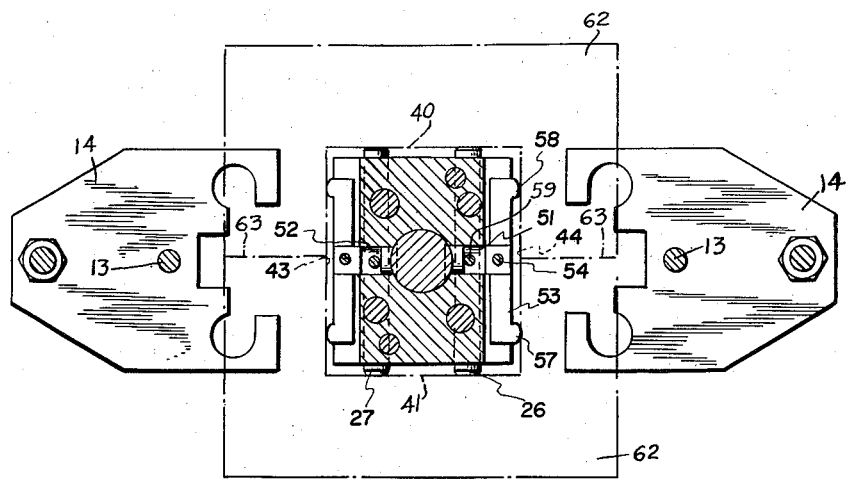
Fig. 7 is a view taken substantially along line 7—7 in Fig. 3.

Referring now to Fig. 7, shafts 51 and 52 are located perpendicular to the centering pins 26 and 27, and in a plane above and parallel to the plane of the centering pins 26 and 27. The shaft 51, as shown in Fig. 4, is prevented from turning by a threaded member 59 acting against a flat surface 60. Since each of these shafts is actuated in like manner by a single actuating pin 56, shaft 51 only will now be described.

Attached to the outermost end of shaft 51 by a peg, rivet or like means, designated as 54, in Fig. 7, is an arm 53. The arm 53 may pivot about the point 54. The shafts 51 and 52 are moved apart by means of cam surfaces 55—55, Fig. 4, on the actuating pin 56. The actuating pin 56 is urged downwardly by turning the threaded member 23. Abutments or integral portions 57 and 58 on the arm 53 engage the inner wall 44 of the tubing. The shaft 52 with its arm has corresponding and opposite motion to that of shaft 51. In this manner the jig is centered with respect to the walls 43 and 44 of the tubing.

The operation of the invention is as follows: with the centering pins in the retracted position (Fig. 8), the template 10 is placed on a flange 62 of a rectangular tubing, such as wave guide tubing, with the lower portion 18 of the rectangular block 17 fitting into the aperture of the tubing. Each of the rods 22, 23 and 24 is then rotated to thread them downwardly into the block 17. The rod 22, as it threads downwardly, urges the actuating pin 34 downwardly, Fig. 6. It should be noted that the lower portion 18 of the block 17 extends within the wave guide tubing in such a manner that the pins 26 and 27 will have their extremities against the sides of the channel-shaped portions which are parallel with respect to the ends of the parallel legs of the channel-shaped portions, whereas the pivoted arms straddle the junctures 63—63 of the two portions of the wave guide flange, as may be seen in Fig. 7. The cam surface 35 on the lower end of the actuating pin 34 urges the two sections 28 and 29 of the centering pin 26 apart and outwardly to engage the inner walls 40 and 41 of the wave guide tubing. The actuation of the rod 24 performs in like manner upon the centering pin 27. This action of these two centering pins will center the jig along the axis between the two walls 40 and 41.

The threaded rod 23 as it is moved downwardly urges the actuating pin 56, Fig. 4, downwardly. The cam surfaces 55—55 on the lower end of the actuating pin 56 urges the two shafts 51 and 52 apart and outwardly. Referring to Fig. 7, as the shaft 51 is urged outwardly, the arm 53 which is pivotally secured to the shaft 51 at 54 will also be urged outwardly. The abutments 57 and 58 at each end of the arm 53 will engage the inner wall 44. The shaft 52 operates in like manner. Even if the inner wall 43 of the tubing is not exactly parallel to the opposite wall 44, the jig and therefore the template attached thereto will be centered along the axis between these two walls. After the centering operation is completed, the template is secured to a flange 62, to be worked, by means of the bolts 13—13 threaded into the clamping plates 14—14 by turning wing-nut ends 61—61. It should be evident from this description that other templates than a drill template may be used in cooperation with the herein disclosed centering jig.

It should also be understood that the present invention will operate successfully if the flanged wave guide were to be made of a single unitary piece, providing that two sides of the aperture are parallel.

It will be understood that the embodiment herein described is merely illustrative of the invention and one application thereof and that modifications can be made and it is capable of other applications.

What is claimed is:

1. A template-centering jig comprising a depending body portion to fit inside the end of a flanged tubing, a plurality of pins extending horizontally from the body portion to engage the inner walls of the tubing, cam means for actuating said pins, a plurality of members extending through the upper surface of said body portion for actuating said cam means, a pair of shafts extending horizontally partially through the lower part of said body portion spaced above said pins and at right angles thereto, an arm pivotally secured at the center to the end of one of said shafts, another arm pivotally secured at the center to the end of the other of said shafts, integral portions extending from each of the ends of each of said arms to engage the inner walls of the tubing, and clamping means for securing a template to said flanged tubing.

2. A centering jig comprising a rectanguar block portion to fit within a flanged tubing, two pins extending horizontally through the lower part of said block in spaced relationship, each of said pins being in two sections such that said sections may be moved outwardly with respect to each other to engage the inner walls of the tubing, cam means to actuate the two sections of each pin, two shafts extending horizontally into said block spaced above said pins and at right angles thereto, said shafts being movable relative to each other, cam means to actuate said shafts, rod means extending vertically through the upper surface of said block to actuate both said cam means, an arm pivotally secured at the center to one end of one shaft, another arm pivotally secured at the center to the end of the other shaft, and integral portions extending from each of the ends of said arms at right angles thereto to engage the inner walls of the tubing as the shaft sections are moved relative to each other.

3. In a jig for locating a template with respect to the center of an apertured member wherein the aperture has at least two parallel sides, of means extending within the aperture, a plurality of pins extending from said means, said pins when actuated engaging two parallel inner sides of the apertured member, cam means for actuating said pins, a pair of shafts movably secured within said means, each of said shafts extending partially through said means and in a position perpendicular to said pins, a pair of arms each pivotally secured at its midpoint to an extremity of one of said shafts, a lateral extending integral member formed at both extremities of each of said arms, said extending portions when actuated engaging the inner sides of the apertured member other than the parallel sides, and means to actuate said shafts, whereby said extending portions are actuated.

4. In a jig for locating a template with respect to the center of an apertured member, said apertured member being formed of two complementary portions and the aperture formed with at least two parallel sides, of means extending within the aperture, locating means extending from said means extending within the aperture, said locating means when actuated engaging two parallel inner sides of the aperture and centering the jig with respect thereto, means to actuate said locating means, a second locating means extending from said means extending within the aperture, said second locating means when actuated engaging two inner sides of the aperture other than said two parallel sides and formed whereby the juncture of said two complementary portions forming said apertured member is straddled thereby, and means to actuate said second locating means.

5. A centering jig comprising a block portion to fit within an aperture in a member, a plurality of pins extending in at least two directions from said block portion for engaging portions of the inner surface of the aperture, a plurality of shafts extending in at least two other directions from said block portion, an arm pivotally secured adjacent the end of each shaft for engaging other portions of the inner surface of the aperture, cam means for actuating said pins and shafts, a plurality of rod members extending through the upper surface of said block portion for actuating said cam means, and means for securing said centering jig to a template.

References Cited in the file of this patent

UNITED STATES PATENTS

| | | |
|---|---|---|
| 1,029,386 | Mays | June 11, 1912 |
| 1,431,522 | Hayman | Oct. 10, 1922 |
| 2,270,158 | Baesgen et al. | Jan. 13, 1942 |
| 2,472,374 | Giles | June 7, 1949 |
| 2,645,140 | Meilstrup | July 14, 1953 |

FOREIGN PATENTS

| | | |
|---|---|---|
| 195,701 | Great Britain | Apr. 12, 1923 |